United States Patent Office 2,843,559
Patented July 15, 1958

2,843,559

HEAT-RESISTANT ENAMELING PAINT CONTAINING SILICONE RESIN

Murray Kornbluth, New York, N. Y., assignor to the United States of America as represented by the Secretary of the Army No Drawing. Application December 2, 1957
Serial No. 700,237

12 Claims. (Cl. 260—33.4)

(Granted under Title 35, U. S. Code (1952), sec. 266)

The invention described herein may be manufactured and used by or for the Government for governmental purposes, without payment to me of any royalty thereon.

The present invention provides an improved protective coating for ferrous metal shapes, for example mild or low-carbon steel shapes, which coating has been found to provide a good appearance and rust-protection for such shapes at normal atmospheric temperatures, and which continues to provide such characterstics when exposed to high temperatures for prolonged periods of time up to about 1600° F., the improved composition acting as a standard commercial paint at low temperatures and as an adherent vitreous enamel at elevated temperatures, whereby there is obtained throughout the desired temperature range an efficient coating for preventing corrosion or rusting of the shape to which the composition is applied, throughout all temperature ranges to which the shape will be subjected when in service.

The present application is a continuation-in-part of the co-pending application, Serial No. 428,393, filed May 7, 1954, and entitled "Heat-Resistant Enameling Paint and Process of Producing Same."

The improvements of the present invention have been accomplished by incorporating certain combinations of pre-prepared ceramic or vitreous frits as part of the pigment content of a more or less conventional paint coating composition; and it may be pointed out at this point that the preparation of the coatings as will be hereinafter described is based on a new and novel approach not heretofore employed in the preparation of heat-resistant paints, namely, the conversion at elevated temperatures of glass-like or vitreous materials in the pigment portion of the paint into a film-binding material having characteristics of porcelain enamel.

As is well known, a paint system consists generally of a homogeneous mixture of film formers, pigment extenders, thinners, dryers and/or other modifying agents. The film former binds the other materials and fixes the coating to the substrate. However, when the substrate is a shape which may become heated to temperatures of the order of 500° F. or higher, the conventionally employed film formers usually become burned off, resulting in film destruction and loss of adhesion with attendant oxidation or rusting of the substrate.

Generally, the method employed in the present invention is predicated upon the utilization of glass-like frit formers, otherwise known as ceramic or vitreous frits, as a portion of the pigment component of the paint, in conjunction with high temperature-resistant resins. These frits, having varied melting points and coefficients of expansion, are individually formulated and then blended in such proportions as to provide a material with a composite coefficient of expansion approximately equal to that of the metal substrate, and the initial melting point is approximately equal to the resin-destructive temperature; and the components of the blended material progressively melt with increased temperatures so as to provide continuously a film-forming component up to temperatures of approximately 1600° F. Frit materials either are volatilized or react with the metal substrate when elevated to temperatures substantially higher than their melting point temperatures. This condition, in addition to that described above, requires the utilization of a blend of frits which have initial melting point temperatures ranging from the destruction temperature of the binder up to about 1500° F. or higher. Further modification of the film characterstics can be obtained by the utilization of refractory materials and/or metal powders to improve film characteristics.

From the above considerations, it will be seen that the present invention provides a protective coating for metals which possesses a good appearance and excellent protection for metals at normal atmospheric temperatures and to continue to provide these properties when exposed to temperatures for prolonged periods of time up to approximately 1600° F. This is accomplished in accordance with the present invention by incorporating combinations of ceramic or vitreous frits as will be indicated in detail hereinafter, at least as part of the pigment content of a paint-like coating composition. These frits are reduced in particle size (in practice substantially 325-mesh or finer), so that at normal temperatures they function as pigments in the paint film. However, when exposed to high temperatures, reaching the fusion point of each frit component, such progressively melt and fuse to the base metal to provide a ceramic type of vitreous film resembling an enamel coating. The fused frit replaces the organic or semi-organic vehicle or binder which is destroyed at the high-temperature exposure.

In practice, several frits of different melting points are selected so that fusion occurs as the organic or semi-organic binder is destroyed. The lower melting frit component begins to function as the binder at temperatures from 600° F. to 800° F., and the higher melting frit components fusing at their respective melting points as the exposure temperature increases. In this manner, there is provided protection and decorative appearance up to 1500° F. and higher.

The vehicle used in this coating is to be selected from those resins or oils which have exceptionally good heat resistance and stability in order to make this coating durable and protective up to the temperature at which the frit combination used starts to fuse. The present improved composition offers the following definite advantages, among others, over the prior art:

(1) Protection of the substrate metal from the elements at all temperatures from normal atmospheric through 1500° F.

(2) The coating is applied and handled in the same manner as conventional paints.

(3) The coating can be produced in a variety of colors.

(4) The coating can be produced on conventional equipment well known to the industry and in present use.

As has been indicated above, the present composition is a paint which comprises essentially a blend of pigment, frits, refractory materials, and/or powdered metals and minerals dispersed in a heat-resistant silicone vehicle. It is not required that this coating be fused to the metal substrate under extremely controlled conditions. After application by conventional means utilized in the paint field, and air-drying, the coating is fused by heat developed in the coated component. For instance, coatings prepared in accordance with the present invention can be used to protect diesel and gas generator mufflers and manifolds, cowlings on jet aircraft, space heating equipment, boilers, aircraft and automotive engines, or elsewhere in any application where corrosion at high temperatures is desired to be avoided.

In preparing the improved coating compositions of the present invention, the following procedure is preferred, although it will be apparent that variations in details may become suggested to one skilled in the art to fit specific circumstances without departing from the inventive concept.

The frits are prepared in the following preferred illustrative manner:

The materials utilized as frits are blended and pulverized. Smelting of the blended and pulverized material is accomplished by placing the finely ground mix in a crucible and heating the mass over a thirty-minute period in a furnace until the mix is completely molten. The temperature then is raised approximately an additional 100° C. over a five-minute time interval, and the molten mix is allowed to react for thirty minutes. Upon completion of the reaction, the molten mix is poured rapidly into cold water preferably contained in a steel container which the cold quenching water partially fills. This quenching results in immediate solidification and fracture of the glass-like materials formed on cooling the molten mix. After the water is poured off, the resulting frit composition is ground to 325-mesh fineness, or finer, by any conventional grinding method. As will be apparent, specific melting and reaction temperatures will be determined by the particular composition of the materials being employed for the frits. In any case, it is requisite that the temperatures employed are sufficiently high to obtain a fully molten body of the material, the same considerations also applying to the time employed for the heating, such conditions being dependent upon the compositons and also the amounts by weight of the frit-forming materials being heated. Examples of suitable frit compositions are indicated below, by way of specific illustrative examples, all of the indicated compositions being resolved into suitable frits by the above-outlined procedure.

After having prepared the frits as is indicated by the above procedure, the compositions of the present invention are completed in the following manner:

Grinding pastes are prepared by dispersing the pigments, frits, and refractory materials in the minimum amount of solvent mixture required to wet the aforesaid solid material mixture. The minimum amount of film-former, such as a silicone resin to produce a string when a spatula or glass rod is dipped into and withdrawn from the paste, is added. The paste then is ball-milled for 96 hours by methods well known in the art, after which the remaining film-formers, modifiers, and solvents are added. If desired, metallic paste or powder modifiers may be added to the finished paint. The vehicle may be a standard silicone polymer resin varnish.

The invention is illustrated by the following specific illustrative examples. There are also indicated below frit compositions covering frits Nos. 1, 2, 4, and 6. In each illustrative example set forth below, there is produced a protective coating for metal which affords adequate protection of the metallic substrate through all ranges of temperatures up to approximately 1600° F. The properties of each coating are that the vehicle serves as a binder up to the temperature at which the frit fuses to form a porcelain enamel finish. This means that the vehicle must be of a nature that serves as a binder and give satisfactory protection up to the fusion point of the frits being used as the pigment portion.

FRIT COMPOSITIONS

| Material | Parts by Weight, Frits # | | | |
|---|---|---|---|---|
| | 1 | 2 | 4 | 6 |
| Borax ($Na_2B_4O_7.10H_2O$) | 96 | 15 | 15 | 15 |
| Lead Monoxide (PbO) | 20 | | | |
| Sodium Carbonate ($Na_2CO_3$) | 16 | 35 | 35 | 35 |
| Sodium Nitrate ($NaNO_3$) | 12 | | | |
| Fluorspar ($CaF_2$) | 20 | | | |
| Cryolite ($Na_3AlF_6$) | 40 | 50 | 50 | 50 |
| Barium Carbonate ($BaCO_3$) | 20 | 25 | 25 | 25 |
| Zinc Oxide (ZnO) | 20 | | | |
| Silica ($SiO_2$) | 80 | 250 | 300 | 250 |
| Feldspar ($Na_2O$ or $K_2O$ $Al_2O_3.6SiO_2$) | 92 | 175 | 175 | 175 |
| Cobalt Oxide ($Co_3O_4$) | 1 | | | 2 |
| Aluminum Oxide ($Al_2O_3$) | | | | 100 |
| Fusion Temperature of Frit #1, °F | 1,050 | | | |
| Fusion Temperature of Frit #2, °F | | 1,300 | | |
| Fusion Temperature of Frit #4, °F | | | 1,350 | |
| Fusion Temperature of Frit #6, °F | | | | 1,600 |

*Example I (Composition No. L–227–2)*

| Pigment and Other Solid Components | Weight, Lbs. | Percent Pigment | Percent of Total Paint |
|---|---|---|---|
| Frit #1 | 160.0 | 26.03 | 12.62 |
| Frit #4 | 120.0 | 19.51 | 9.46 |
| Frit #6 | 120.0 | 19.51 | 9.46 |
| Chrome Oxide Green | 59.6 | 9.69 | 4.70 |
| Magnesium Silicate | 66.6 | 10.83 | 5.25 |
| Red Iron Oxide | 4.25 | .69 | .34 |
| Manganese Dioxide | 1.5 | .24 | .12 |
| Aluminum Stearate | 3.0 | .49 | .24 |
| Mica | 80.0 | 13.01 | 6.30 |
| Total Pigment | 614.95 | 100.00 | 48.49 |
| Vehicle Components: | | Percent Vehicle | |
| Polymeric Methyl Silicone having in its molecule an average from approximately 1.3 to 1.7 methyl groups per silicon atom | 196.2 | 30.04 | 15.47 |
| Melamine Formaldehyde Resin | 88.8 | 13.59 | 7.00 |
| Coumarone-Indene Resin | 65.4 | 10.01 | 5.16 |
| Volatile Organic Solvents | 302.8 | 46.36 | 23.88 |
| Total Vehicle | 653.2 | 100.00 | 51.51 |
| Grand Total | 1,268.15 | | 100.00 |

*Example II (Composition No. L–227–4)*

| Pigment and Other Solid Components | Weight, Lbs. | Percent Pigment | Percent of Total Paint |
|---|---|---|---|
| Frit #1 | 154.0 | 26.68 | 12.72 |
| Frit #4 | 115.0 | 19.91 | 9.50 |
| Frit #6 | 115.0 | 19.91 | 9.50 |
| Chrome Oxide Green | 54.0 | 9.35 | 4.46 |
| Magnesium Silicate | 60.0 | 10.39 | 4.96 |
| Red Iron Oxide | 4.0 | .69 | .33 |
| Manganese Dioxide | 1.0 | .17 | .08 |
| Aluminum Stearate | 2.5 | .43 | .21 |
| Mica | 72.0 | 12.47 | 5.95 |
| Total Pigment | 577.5 | 100.00 | 47.71 |
| Vehicle Compounds: | | Percent Vehicle | |
| Polymeric Methyl Chloro-phenyl Silicone wherein the average ratio of the sum of the methyl and chloro-phenyl groups per silicon atom is between one and two | 172.7 | 27.28 | 14.27 |
| Melamine Formaldehyde Resin | 78.0 | 12.32 | 6.44 |
| Coumarone-Indene Resin | 58.8 | 9.29 | 4.86 |
| Volatile Organic Solvents | 323.5 | 51.11 | 26.72 |
| Total Vehicle | 633.0 | 100.00 | 52.29 |
| Grand Total | 1,210.5 | | 100.00 |

The following tables indicate specific test results obtained from the foregoing compositions of Examples I and II, respectively.

TABLE 1

Test results.—Example I above
(Composition No. L-227-2)

| Temp. Exposure | Adhesion | Quench Test, 650° F. | Salt Spray, 100 Hrs. 5% NaCl Solution | Condition After 10-Cycles |
|---|---|---|---|---|
| Air Dry | Very good | | Very good | Hard. |
| 600° F | do | Very good | do | Very slightly soft film. |
| 1,000° F | Excellent | Excellent | Excellent | Very hard gloss like film. |
| 1,400° F | do | do | do | Do. |

TABLE 2

Test results.—Example II above
(Composition No. L-227-4)

| Temp. Exposure | Adhesion | Quench Test, 650° F. | Salt Spray, 100 Hrs. 5% NaCl Solution | Condition After 10-Cycles |
|---|---|---|---|---|
| Air Dry | Very good | | Very good | Hard. |
| 600° F | Good | Excellent | do | Slightly soft film. |
| 1,000° F | Excellent | do | Excellent | Very hard glossy film. |
| 1,400° F | Very good | Very good | Very good | Very hard film. |

It is found in practice that the following illustrative compositions produce satisfactory protective coatings up to about 1600° F.

Example III (Composition No. B-54)

| Pigment and Other Solid Components | Weight, Lbs. | Percent Pigment | Percent of Total Paint |
|---|---|---|---|
| Frit #1 | 72.0 | 11.96 | 6.11 |
| Frit #4 | 198.0 | 32.89 | 16.82 |
| Frit #6 | 90.0 | 14.95 | 7.64 |
| Chrome Oxide Green | 108.0 | 17.94 | 9.17 |
| Magnesium Silicate | 121.0 | 20.10 | 10.28 |
| Red Iron Oxide | 8.0 | 1.33 | 0.68 |
| Manganese Dioxide | 2.0 | 0.33 | 0.17 |
| Aluminum Stearate | 3.0 | 0.50 | 0.25 |
| Total Pigment | 602.0 | 100.00 | 51.12 |
| | | Percent Vehicle | |
| Vehicle Components: | | | |
| Silicone Resin | 312.0 | 54.21 | 26.50 |
| Volatile Organic Solvents | 263.5 | 45.79 | 22.38 |
| Total Vehicle | 575.5 | 100.00 | 48.88 |
| Grand Total | 1,177.5 | | 100.00 |

Example IV (Composition No. B-60)

| Pigment and Other Solid Components | Weight, Lbs. | Percent Pigment | Percent of Total Paint |
|---|---|---|---|
| Frit #1 | 144.0 | 23.92 | 12.23 |
| Frit #4 | 108.0 | 17.94 | 9.17 |
| Frit #6 | 108.0 | 17.94 | 9.17 |
| Chrome Oxide Green | 108.0 | 17.94 | 9.17 |
| Magnesium Silicate | 121.0 | 20.10 | 10.28 |
| Red Iron Oxide | 8.0 | 1.33 | 0.68 |
| Manganese Dioxide | 2.0 | 0.33 | 0.17 |
| Aluminum Stearate | 3.0 | 0.50 | 0.25 |
| Total Pigment | 602.0 | 100.00 | 51.12 |
| | | Percent Vehicle | |
| Vehicle Components: | | | |
| Silicone Resin | 312.0 | 54.21 | 26.50 |
| Volatile Organic Solvents | 263.5 | 45.79 | 22.38 |
| Total Vehicle | 575.5 | 100.00 | 48.88 |
| Grand Total | 1,177.5 | | 100.00 |

Example V (Composition No. E-106)

| Pigment and Other Solid Components | Weight, Lbs. | Percent Pigment | Percent of Total Paint |
|---|---|---|---|
| Frit #2 | 405.0 | 74.76 | 31.98 |
| Chrome Oxide Green | 63.5 | 11.72 | 5.01 |
| Magnesium Silicate | 63.5 | 11.72 | 5.01 |
| Red Iron Oxide | 4.2 | 0.78 | 0.33 |
| Cobaltic Oxide | 3.5 | 0.65 | 0.28 |
| Aluminum Stearate | 2.0 | 0.37 | 0.16 |
| Total Pigment | 541.7 | 100.00 | 42.77 |
| | | Percent Vehicle | |
| Vehicle Components: | | | |
| Silicone Resin | 414.0 | 57.10 | 32.68 |
| Volatile Organic Solvents | 311.0 | 42.90 | 24.55 |
| Total Vehicle | 725.0 | 100.00 | 57.23 |
| Grand Total | 1,266.7 | | 100.00 |

Example VI (Composition No. E-108)

| Pigment and Other Solid Components | Weight, Lbs. | Percent Pigment | Percent of Total Paint |
|---|---|---|---|
| Frit #1 | 163.0 | 29.95 | 13.30 |
| Frit #4 | 122.7 | 22.54 | 10.02 |
| Frit #6 | 122.7 | 22.54 | 10.02 |
| Chrome Oxide Green | 60.0 | 11.00 | 4.90 |
| Magnesium Silicate | 67.8 | 12.45 | 5.53 |
| Red Iron Oxide | 4.3 | 0.79 | 0.35 |
| Manganese Dioxide | 1.0 | 0.18 | 0.08 |
| Aluminum Stearate | 3.0 | 0.55 | 0.24 |
| Total Pigment | 544.5 | 100.00 | 44.44 |
| | | Percent Vehicle | |
| Vehicle Components: | | | |
| Silicone Resin | 270.0 | 39.65 | 22.03 |
| Melamine Formaldehyde Resin | 90.6 | 13.30 | 7.39 |
| Volatile Organic Solvents | 320.4 | 47.05 | 26.14 |
| Total Vehicle | 681.0 | 100.00 | 55.56 |
| Grand Total | 1,225.5 | | 100.00 |

Example VII (Composition No. EX. #4)

| Pigment and Other Solid Components | Weight, Lbs. | Percent Pigment | Percent of Total Paint |
|---|---|---|---|
| Frit #1 | 160.0 | 26.02 | 12.55 |
| Frit #4 | 120.0 | 19.52 | 9.41 |
| Frit #6 | 120.0 | 19.52 | 9.41 |
| Chrome Oxide Green | 59.6 | 9.69 | 4.67 |
| Magnesium Silicate | 66.6 | 10.83 | 5.22 |
| Red Iron Oxide | 4.25 | 0.7 | 0.33 |
| Manganese Dioxide | 1.5 | 0.2 | 0.11 |
| Aluminum Stearate | 3.0 | 0.5 | 0.24 |
| Mica | 80.0 | 13.02 | 6.28 |
| Total Pigment | 614.95 | 100.00 | 48.22 |
| | | Percent Vehicle | |
| Vehicle Components: | | | |
| Silicone Resin | 354.6 | 53.71 | 27.81 |
| Volatile Organic Solvents | 305.6 | 46.29 | 23.97 |
| Total Vehicle | 660.2 | 100.00 | 51.78 |
| Grand Total | 1,275.15 | | 100.00 |

*Example VIII (Composition No. EX. #5)*

| Pigment and Other Solid Components | Weight, Lbs. | Percent Pigment | Percent of Total Paint |
|---|---|---|---|
| Frit #1 | 150.0 | 25.97 | 11.55 |
| Frit #4 | 113.0 | 19.57 | 8.71 |
| Frit #6 | 113.0 | 19.57 | 8.71 |
| Chrome Oxide Green | 56.0 | 9.70 | 4.82 |
| Magnesium Silicate | 62.5 | 10.82 | 4.82 |
| Red Iron Oxide | 4.0 | .69 | .31 |
| Manganese Dioxide | 1.0 | .17 | .08 |
| Aluminum Stearate | 3.0 | .52 | .23 |
| Mica | 75.0 | 12.99 | 5.78 |
| Total Pigment | 577.5 | 100.00 | 44.51 |
|  |  | Percent Vehicle |  |
| Vehicle Components: |  |  |  |
| Silicone Alkyd Copolymer | 348.8 | 47.75 | 26.50 |
| Volatile Organic Solvents | 376.2 | 52.25 | 28.99 |
| Total Vehicle | 720.0 | 100.00 | 55.49 |
| Grand Total | 1,297.5 |  | 100.00 |

*Example IX (Composition No. EX.-6)*

| Pigment and Other Solid Components | Weight, Lbs. | Percent Pigment | Percent of Total Paint |
|---|---|---|---|
| Frit #1 | 150.0 | 25.97 | 12.43 |
| Frit #4 | 113.0 | 19.57 | 9.37 |
| Frit #6 | 113.0 | 19.57 | 9.37 |
| Chrome Oxide Green | 56.0 | 9.70 | 4.64 |
| Magnesium Silicate | 62.5 | 10.82 | 5.18 |
| Red Iron Oxide | 4.0 | .69 | .33 |
| Manganese Dioxide | 1.0 | .17 | .08 |
| Aluminum Stearate | 3.0 | .52 | .25 |
| Fused Quartz | 75.0 | 12.99 | 6.22 |
| Total Pigment | 577.5 | 100.00 | 47.87 |
|  |  | Percent Vehicle |  |
| Vehicle Components: |  |  |  |
| Silicone Resin | 332.4 | 52.85 | 27.55 |
| Volatile Organic Solvents | 296.6 | 47.15 | 24.58 |
| Total Vehicle | 629.0 | 100.00 | 52.13 |
| Grand Total | 1,206.5 |  | 100.00 |

*Example X (Composition No. F-118)*

| Pigment and Other Solid Components | Weight, Lbs. | Percent Pigment | Percent of Total Paint |
|---|---|---|---|
| Frit #1 | 89.4 | 17.69 | 7.95 |
| Frit #2 | 121.0 | 23.94 | 10.76 |
| Frit #4 | 45.3 | 8.96 | 4.03 |
| Frit #6 | 45.3 | 8.96 | 4.03 |
| Zinc Dust | 75.0 | 14.84 | 6.67 |
| Chrome Oxide Green | 50.0 | 9.89 | 4.45 |
| Magnesium Silicate | 35.0 | 6.92 | 3.11 |
| Mica | 35.0 | 6.92 | 3.11 |
| Red Iron Oxide | 5.0 | .99 | .44 |
| Chrome, Copper Manganese Oxide Black | 1.5 | .30 | .13 |
| Aluminum Stearate | 3.0 | .59 | .27 |
| Total Pigment | 505.5 | 100.00 | 44.95 |
|  |  | Percent Vehicle |  |
| Vehicle Components: |  |  |  |
| Silicone Resin | 249.0 | 40.23 | 22.14 |
| Melamine Formaldehyde Resin | 83.4 | 13.47 | 7.42 |
| Volatile Organic Solvents | 286.6 | 46.30 | 25.49 |
| Total Vehicle | 619.0 | 100.00 | 55.05 |
| Grand Total | 1,124.5 |  | 100.00 |

In the above-indicated frits compositions, the borax may be replaced by a corresponding salt of other boron acids, such as $Na_3BO_3$, or $NaBO_2$. However, borax is preferred. Also, the lead monoxide constituent may be replaced by other lead compounds capable of reacting with the boron compound at high temperatures to form a lead borate. Thus, there may be employed any of the well-known lead oxides, lead carbonates, basic lead carbonate, and similar inorganic and organic compounds capable of reacting with the boron compound at elevated temperatures.

The silicone resins employed in the vehicles of the above-mentioned illustrative examples may be defined generically as silicone polymers, the preparation of which is described in a number of issued patents of which Nos. 2,258,218; 2,258,219; 2,258,220; 2,258,221; and 2,258,222 are representative. These silicone polymers are available on the market as commercial products, and since their composition and mode of manufacture forms no part of the present invention, it is thought to be unnecessary to refer to them or to their composition in greater particularity.

The modifying resins are not required for this invention, but are used to lower costs without impairing performance when not used to excess. The modifiers have no effect on performance above 800° F., but do have a slight effect in reducing heat resistance at temperatures below 800° F.

The specific operative silicone polymers which can be used are a methyl silicone resin, in the range of methyl to silicon ratio of 1.3 to 1.7. Another type is an organosiloxane polymer with attached alkyl and/or aryl groups; for example, a methyl phenyl silicone resin in which the molar proportion of phenyl to methyl may fall between 1:10 through 1:1, described in Rochow Patent 2,258,222. Polymeric methyl aryl silicones containing an average of less than two total methyl and aryl groups for each silicon atom are preferred. Products having good thermal resistance are polymers containing an average of approximately 1 to approximately 1.4 total methyl and aryl groups per silicon atom.

It is known in the art that it has been proposed to prepare heat-resistant paints employing these silicone polymers as the principal component of the vehicle. Such paints afford excellent protection to metal surfaces, in some instances up to approximately 575° F., and when not exposed to any higher temperatures are waterproof and last for relatively long periods of time. When, however, such paints are heated to higher temperatures, for example, of the order from approximately 750° F. to 1200° F., they crack, peel, and disintegrate into a loose dust. As a consequence, a steel surface coated with such silicone paints is oxidized after a few hours of heating, first to a spongy ferrosoferric oxide and finally to ferric oxide. At the same time, any metal pigments in the film, such as aluminum and zinc, also are oxidized. It also has been recognized that the foregoing defects of silicone paints are overcome to a certain extent by the use of a boric acid-lead compound mixture when such is combined with a vehicle consisting wholly or partly of a silicone polymer varnish, the coating remaining intact when the coated metal is heated to somewhat above 300° C. (approximately 575° F.). As an improvement over such materials, it is found in practice that the coating composition prepared in accordance with the present invention affords excellent protection to metal substrate surfaces when heated through 1500° F. and even as high as approximately 1600° F.

In the preparation of the coating composition of the present invention, considering the frit and refractory as the pigment portion of the paint, it is found in practice that satisfactory compositions can be made over pigment volume concentration ranges of 50 to 25 percent. The preferred composition is at a pigment volume concentration of 35%. The preferred frit to refractory ratio is 4 to 1 by weight, although a range of from 2 to 1 through 6 to 1 can be used. For optimum performance, as the frit to refractory ratio is increased, improved performance occurs at the lower limits of the pigment volume concentration (25%). The preferred frit blend is: low melting point frit, 4 parts by weight; medium melting point frit, 3 parts; high melting point frit, 3 parts. For obtaining satisfactory performance, the blend of low and medium melting point frits must be kept at a level of 50% or better by weight, of the total frit mixture. The range for frit blending is the following, indicated as percentages by weight:

Low melting point frit _____ 70–40
Medium melting point frit _____ 20–40
High melting point frit _____ 10–20

The various blends of materials used to prepare the frits were chosen in order to develop frits with a range of melting points within the operating range. This was required in order to provide a group of frits, the melting point of which ranges from the burn-off point of the silicone to the top operating temperature, thus providing continuous fusion in a step-wise manner.

The solvents employed in the vehicle are not particularly critical as to performance, but are based primarily on the method of application of the paint. In the above illustrative examples, a mixture of xylene, toluene, and butyl alcohol was used in the following proportions by volume:

Xylol/toluol/butyl alcohol 1/1/0.7
Xylol/toluol/butyl alcohol 1/1/0.3

For satisfactory performance, the thickness of the applied film may vary from a minimum of 1 mil to a maximum of 3 mils, with an optimum of 2 mils being preferred. For coloring the coating, any colored pigment which is heat resistant within the indicated temperature range can be utilized to produce a desired color or shade without affecting the performance of the coating. Examples of usable pigments, but not limiting a choice to this group are: titanium dioxide, cadmium selenide, chromium oxide, yellow iron oxide, phthalocyanine green. Zinc dust may be used as a metallic modifier to improve heat resistance in the 800° to 1200° F. range.

As vehicles for the present composition, there are employed pure silicone varnishes in concentrations of 5 percent to 50 percent of silicone resin, for instance, methyl polysiloxane resin, but preferably within the concentration range of 10 percent to 30 percent, or, in combination with solutions of other resins, such as phenol-formaldehyde, in ratios of 1 silicone to 1–5 phenol-formaldehyde, phenol modified glyceryl-phthalic resins, glyceryl-phthalic and other polymerization products of polyhydric alcohols and polybasic acids as well as varnishes commonly used in the manufacture of paints. The amount of solvent used may vary between 30 and 80 percent by weight of the total vehicle, and, if necessary, a small amount of dispersing agents may be used in cases where the varnishes employed cannot be dispersed readily in silicone solutions. Particularly effective dispersing agents are secondary aliphatic amines such as dipropyl-, dibutyl-, diamyl-, or dioctyl-amine, or aromatic amines, such as anilines, toluidines, xylidines, naphthylamines, and the like. Usually perfect dispersion is obtained by the addition of 1 percent to 2 percent by weight of one of these dispersion agents to the mixture of silicone and resin solution.

From the foregoing description, it will be seen that, in general, the present invention provides an improved paint which affords corrosion protection to metal substrate surfaces to which the paint is applied under all atmospheric and temperature conditions up to about 1600° F., which paint comprises a vehicle that includes a silicone resin which provides a high heat-resisting binder; a proper frit which provides a ceramic or vitreous enamel surface, and a refractory material which controls the brittleness of the resulting coating. Also for controlling the color of the coating, selected colored pigments may be included which do not influence the heat-resistance of the coating.

In the foregoing description and in the appended claims, the term "frit" is directed to a pre-formed complex alkaline borosilicate glass, containing fluorine, and produced by melting a mixture comprising borax, feldspar, quartz, and cryolite, quenching the resulting molten mass in cold water, and comminuting the resulting vitreous material. The present composition produces a uniform vitreous enamel coating for steel substrate surfaces when heated above the melting point of the frit, while at usual temperatures it acts as an efficient corrosion-preventing paint. It also takes advantage of the recognized anti-corrosion properties of silicone paints and the enhanced protection afforded by a silicone polymer varnish vehicle as disclosed in U. S. Patent No. 2,495,306, issued January 24, 1950, to Paul Zurcher, and fusion of the frit in the present composition to form the enamel coating takes place before the film-forming protection afforded by the silicone polymer-base vehicle becomes impaired.

The enameling paint of the present invention is designed to protect ferrous metal shapes composed of mild steel, against corrosion both at atmospheric temperatures and elevated temperatures up to approximately 1600° F., the solid (pigment) constituents being proportioned to provide an enameling coating having the same coefficient of thermal expansion as the steel substrate shape. The present improved composition is applied to the shape by any well-known painting procedures. For assuring requisite high temperature stability of the vitreous enamel coating resulting from the employment of the present composition, the frit constituent of the composition is usually an aggregate of a plurality of previously produced frits which have been comminuted and intercommingled into a homogeneous frit mixture or aggregate which is employed as the base component of the pigment for the composition. As has been indicated above, these previously-prepared frits have melting points increasing step-wise between the limits of 1050° F. and 1600° F., although the invention is not thus limited necessarily. The frit components employed in making the frit aggregate are selected as having a wide range of melting points for producing a stable enamel coating at temperatures up through at least 1500° F. The frit aggregate is composed of a plurality of pre-produced, comminuted frit compositions, each frit composition as an individual component of the resulting aggregate having a definite step-wise increasing melting point between the above-indicated ranges, so that the enamel coating obtained at such elevated temperatures will be formed automatically at the desired selected melting point of the selected frit constituent of the aggregate.

Having thus described my invention, what I claim as new and wish to secure by Letters Patent is:

1. A high-temperature resistant enameling paint for producing a vitreous enamel anti-corrosion coating on ferrous metal shapes at elevated temperatures, which comprises a vehicle consisting essentially of a silicone polymer varnish for providing a high heat-resisting binder film, and a refractory frit as a pigment base for the paint, the said frit being an aggregate of a plurality of frits having step-wise increasing melting points between approximately 1050° F. and approximately 1600° F. to provide when fused a vitreous enamel coating for the ferrous shape to be protected.

2. A high-temperature resistant enameling paint as claimed in claim 1 wherein the pigment includes in addition to the frit aggregate, a refractory ceramic material for controlling brittleness of the resulting enamel coating.

3. A high-temperature resistant enameling paint as claimed in claim 2, wherein the pigment components are proportioned for producing an enamel coating having a coefficient of thermal expansion corresponding to that of the substrate shape.

4. A high-temperature resistant enameling paint as claimed in claim 3 further including a selected colored pigment for effecting a controlled color in the coating.

5. A high-temperature resistant enameling paint for protecting ferrous metal shapes against corrosion, which comprises a vehicle comprising a silicone polymer as its principal constituent, and a pigment comprising a frit as its principal constituent, the said frit being an aggregate of a pluraliy of frits having melting points ranging from approximately 1050° F. to approximately 1600° F., the pigment also including a refractory ceramic material for controlling brittleness of the resulting vitreous enamel coating, the said coating being stable at temperatures at least through 1500° F.

6. A high-temperature resistant enameling paint for producing a vitreous enamel coating on ferrous metal articles at elevated temperatures, which comprises a vehicle including a silicone polymer resin as base constituent of the vehicle and a solvent for the resin, and a pigment including a previously-prepared frit as base constituent of the pigment, the said frit being an aggregate of a low melting point frit having a melting point of approximately 1050° F., a medium melting point frit having a melting point of approximately 1300° F. to 1350° F., and a high melting point frit having a melting point of approximately 1600° F., the said frit aggregate containing approximately 4 parts by weight of the low melting point frit, approximately 3 parts by weight of the medium melting point frit, and approximately 3 parts by weight of the high melting point frit, for producing a vitreous enamel coating which is stable at temperatures up to at least approximately 1600° F.

7. A high-temperature resistant enameling paint for producing a vitreous enamel coating on ferrous metal articles at elevated temperatures, which comprises a silicone polymer varnish as vehicle, and a pigment including a previously-prepared frit as base constituent of the pigment, the said frit being an aggregate of a low melting-point frit having a melting point of approximately 1050° F., a medium melting point frit having a melting point of approximately 1300° F. to 1350° F., and a high melting point frit having a melting point of approximately 1600° F., the low and medium melting point frits constituting together at least 50% by weight of the total frit aggregate.

8. A high-temperature enameling paint as claimed in claim 7, in which the frit constituent of the pigment is composed of a frist aggregate consisting of from approximately 70% to 40% of the low melting point frit, approximately 20% to 40% of the medium melting point frit, and from approximately 10% to 20% of the high melting point frit, the percentages being by weight.

9. The composition of claim 8, wherein the pigment also includes a ceramic refractory for controlling brittleness of the enamel coating, the frit and refractory being present in ratios ranging from approximately 2 to 1 to approximately 6 to 1, with a pigment volume concentration in the paint ranging from approximately 50% to 25% of the total volume of the paint.

10. The paint composition of claim 9, wherein the pigment volume concentration is approximately 35% and the frit to refractory ratio is approximately 4 to 1 by weight.

11. The paint composition of claim 10 wherein the enamel coating remains stable up to approximately 1600° F. with a coating thickness of from approximately 1 mil to 3 mils.

12. An improved enameling paint for protecting ferrous metal shapes against corrosion at temperatures up to approximately 1600° F., which comprises a silicone polymer varnish vehicle and a pigment including a frit aggregate composed of a plurality of frits having melting points ranging from approximately 1050° F. to approximately 1600° F., the said aggregate being present in a total pigment ratio of substantially 4 to 1, the remainder of the pigment being a ceramic refractory and the total pigment being present in the paint in a pigment volume concentration of substantially 35%.

No references cited.